United States Patent
Imamura et al.

(10) Patent No.: US 8,265,025 B2
(45) Date of Patent: Sep. 11, 2012

(54) RADIO TRANSMISSION DEVICE AND RADIO TRANSMISSION METHOD

(75) Inventors: Daichi Imamura, Kanagawa (JP); Sadaki Futagi, Ishikawa (JP); Masaru Fukuoka, Ishikawa (JP); Takashi Iwai, Ishikawa (JP); Atsushi Matsumoto, Ishikawa (JP)

(73) Assignee: Panasonic Corporation, Osaka (JP)

( * ) Notice: Subject to any disclaimer, the term of this patent is extended or adjusted under 35 U.S.C. 154(b) by 842 days.

(21) Appl. No.: 12/442,475

(22) PCT Filed: Sep. 26, 2007

(86) PCT No.: PCT/JP2007/068661
§ 371 (c)(1),
(2), (4) Date: Mar. 23, 2009

(87) PCT Pub. No.: WO2008/041582
PCT Pub. Date: Apr. 10, 2008

(65) Prior Publication Data
US 2010/0027484 A1    Feb. 4, 2010

(30) Foreign Application Priority Data
Sep. 26, 2006  (JP) ................ 2006-261197

(51) Int. Cl.
*H04J 4/00* (2006.01)
(52) U.S. Cl. ........................... 370/329; 370/342
(58) Field of Classification Search ............... None
See application file for complete search history.

(56) References Cited

U.S. PATENT DOCUMENTS

| | | | |
|---|---|---|---|
| 5,883,887 A * | 3/1999 | Take et al. | 370/329 |
| 6,567,482 B1 * | 5/2003 | Popovic' | 375/343 |
| 6,873,607 B1 * | 3/2005 | Hamada et al. | 370/321 |
| 7,239,621 B2 * | 7/2007 | Eriksson | 370/335 |
| 2001/0024956 A1 * | 9/2001 | You et al. | 455/455 |
| 2001/0036113 A1 * | 11/2001 | Jurgensen et al. | 365/200 |
| 2002/0114294 A1 * | 8/2002 | Toskala et al. | 370/329 |

(Continued)

FOREIGN PATENT DOCUMENTS

JP    2007-266733    11/2007

OTHER PUBLICATIONS

Design of High-Speed Preamble Searcher for RACH Preamble Structure in WCDMA Reverse Link Receiver, Eun-Sun Jung et al., IEEE, 2004, pp. (481-484).*

(Continued)

*Primary Examiner* — Bunjob Jaroenchonwanit
(74) *Attorney, Agent, or Firm* — Seed IP Law Group PLLC

(57) ABSTRACT

Disclosed is a radio transmission device and a radio transmission method which reduces the RACH conflict ratio and improve the RACH detection characteristic. When the device and the method are used: as the number of signature numbers allocated for UE by the network side increases, the condition for allocating a signature by UE itself is mitigated and an expectation value which is a statistic average value of the RA quantity using the signature allocated by UE for itself is decreased; and as the number of signature numbers allocated for UE by the network side decreases, the condition for allocating a signature by UE itself is limited and an expectation value of the RA quantity using the signature allocated by UE for itself is increased.

4 Claims, 12 Drawing Sheets

| NUMBER OF NW ALLOCATIONS | CONDITION UNDER WHICH UE CAN ALLOCATE TO ITSELF | | |
|---|---|---|---|
| | INITIAL RA SLOT | NEXT RA SLOT | NEXT BUT ONE RA SLOT |
| 0 | NO RESTRICTION | NO RESTRICTION | NO RESTRICTION |
| 1 | HIGH PRIORITY ONLY → RETRANSMISSION RA, EMERGENCY CALL | | |
| 2 | | | |
| 3 | EMERGENCY CALL ONLY | HIGH PRIORITY ONLY → RETRANSMISSION RA, EMERGENCY CALL | |
| 4 (DEFAULT) | | | |

U.S. PATENT DOCUMENTS

| | | | | |
|---|---|---|---|---|
| 2003/0069044 | A1* | 4/2003 | Yotsumoto | 455/561 |
| 2003/0076812 | A1* | 4/2003 | Benedittis | 370/350 |
| 2003/0095528 | A1* | 5/2003 | Halton et al. | 370/342 |
| 2003/0103476 | A1* | 6/2003 | Choi et al. | 370/329 |
| 2004/0066740 | A1* | 4/2004 | Suh et al. | 370/208 |
| 2005/0271025 | A1* | 12/2005 | Guethaus et al. | 370/342 |
| 2006/0140255 | A1* | 6/2006 | Jonsson | 375/148 |
| 2007/0165567 | A1* | 7/2007 | Tan et al. | 370/329 |
| 2007/0230600 | A1* | 10/2007 | Bertrand et al. | 375/260 |
| 2008/0227401 | A1* | 9/2008 | Scherzer et al. | 455/67.13 |
| 2008/0293423 | A1* | 11/2008 | Park et al. | 455/450 |
| 2008/0298325 | A1* | 12/2008 | Vujcic | 370/336 |
| 2009/0196239 | A1* | 8/2009 | Lee et al. | 370/329 |
| 2011/0039590 | A1* | 2/2011 | Park et al. | 455/509 |
| 2011/0159802 | A1* | 6/2011 | Binti Harum et al. | 455/7 |

OTHER PUBLICATIONS

3GPP TSG RAN WG1 Meeting #45, "Random access message transmission," Samsung, R1-061317, May 8-12, 2006, pp. 1-4.

International Search Report dated Jan. 15, 2008.

3GPP TSG-RAN WG2, R2-060996, Mar. 27-31, 2006, Athens, Greece, Agenda item: Joint 03.2, Title: Access Procedures, Document for: Discussion and Decision, Mar. 2006, pp. 1-3.

TSG-RAN Working Group 2 #49, R2-052769, Seoul, Korea, Nov. 7-11, 2005, Agenda Item: 17.3.3, Title: Initial access for LTE, Document for: Discussion and Decision, Nov. 2005, pp. 1 and 2, p. 4, line 22.

3GPP TSG Joint Meeting RAN WG1 and RAN WG2 on LTE, R2-060850, Athens, Greece, Mar. 27-31, 2006, Agenda Item: Joint 3.2, Title: Random Access for LTE, Document for: Discussion, Decision, Mar. 2006, 6 pages total.

3GPP TSG RAN WG2 Meeting #52, R2-060852, Athens, Greece, Mar. 27-31, 2006, Title: Random Access usage for RRC state transitions and mobility support, Agenda Item: Joint 03.2, Document for: Discussion—Decision, Mar. 2008, pp. 1-4.

* cited by examiner

| NUMBER OF NW ALLOCATIONS | CONDITION UNDER WHICH UE CAN ALLOCATE TO ITSELF | | |
|---|---|---|---|
| | INITIAL RA SLOT | NEXT RA SLOT | NEXT BUT ONE RA SLOT |
| 0 | NO RESTRICTION | NO RESTRICTION | NO RESTRICTION |
| 1 | HIGH PRIORITY ONLY → RETRANSMISSION RA, EMERGENCY CALL | | |
| 2 | EMERGENCY CALL ONLY | | |
| 3 | | HIGH PRIORITY ONLY → RETRANSMISSION RA, EMERGENCY CALL | |
| 4 (DEFAULT) | | | |

FIG.9

| NUMBER OF NW ALLOCATIONS | CONDITION UNDER WHICH UE CAN ALLOCATE TO ITSELF | CONDITION UNDER WHICH UE CAN ALLOCATE TO ITSELF |
| --- | --- | --- |
| 0 | NO RESTRICTION | NO RESTRICTION |
| 1 | HIGH PRIORITY ONLY | HIGH PRIORITY ONLY |
| 2 | → RETRANSMISSION RA, EMERGENCY CALL | → RETRANSMISSION RA, EMERGENCY CALL |
| 3 | EMERGENCY CALL ONLY | EMERGENCY CALL ONLY |
| 4 (DEFAULT) | | |

FIG.11

| NUMBER OF NW ALLOCATIONS | MUTUAL INTERFERENCE POWER | TOTAL INTERFERENCE POWER | INTERFERENCE MARGIN |
| --- | --- | --- | --- |
| 0 | --- (REFERENCE) | 0 | 10 |
| 1 | 1 | 1 | 9 |
| 2 | 1 | 2 | 8 |
| 3 | 2 | 4 | 6 |
| 4 (DEFAULT) | 2 | 6 | 4 |

FIG.12

RADIO TRANSMISSION DEVICE AND RADIO TRANSMISSION METHOD

TECHNICAL FIELD

The present invention relates to a radio transmitting apparatus and a radio transmission method.

BACKGROUND ART

Mobile communication systems represented by a cellular communication system or wireless LAN (i.e. local area network) systems are provided with a random access region in their transmission regions. This random access region is provided in an uplink transmission region when a terminal station (hereinafter, "UE") sends a connection request to a base station (hereinafter, "BS") for the first time, or when a UE makes a new band allocation request in a centralized control system where a BS or the like allocates transmission times and transmission bands to UEs. The base station may be referred to as an "access point" or "Node B."

Furthermore, in a system using TDMA (i.e. time division multiple access) such as the 3GPP RAN LTE, which is currently undergoing standardization, when a connection request is made for the first time (which takes places not only when a UE is powered on but also when uplink transmission timing synchronization is not established such as when handover is in progress, when communication is not carried out for a certain period of time, and when synchronization is lost due to channel conditions, and so on), random access is used for a first process of acquiring uplink transmission timing synchronization, connection request to a BS (i.e. association request) or band allocation request (i.e. resource request).

A random access burst (hereinafter, "RA burst") transmitted in a random access region (hereinafter, "RA slot"), unlike other scheduled channels, results in reception errors and retransmission due to collision between signature sequences (situation in which a plurality of UEs transmit the same signature sequence using the same RA slot) or interference between signature sequences. Collision of RA bursts or the occurrence of reception errors increases processing delays in the acquisition of uplink transmission timing synchronization including RA bursts and processing of association request to the BS. For this reason, a reduction of the collision rate of signature sequences and improvement of detection characteristics of signature sequences are required.

As the method for improving the detection characteristics of signature sequences, generation of a signature sequence from a GCL (i.e. generalized chirp like) sequence having a low auto-correlation characteristic and also a low inter-sequence cross-correlation characteristic or Zadoff-Chu sequence is under study. A signal sequence, constituting a random access channel and known between transmission and reception, is referred to as a "preamble" and a preamble is generally comprised of a signal sequence having better auto-correlation and cross-correlation characteristics. Furthermore, a signature is one preamble pattern, and suppose the signature sequence and preamble pattern are synonymous here.

Furthermore, according to the technique described in Non-Patent Document 1, initial cell access including RA burst transmission is classified into processing started from the network side (BS side) and processing started from the UE side, the network side reports paging information including system information related to RA burst transmission to the UE through RA burst transmission and it is thereby intended to reduce the collision rate of signature sequences and improve detection characteristics.

To be more specific, paging information reported over a downlink includes uplink interference information (i.e. UL interference) and a dynamic persistent level parameter indicating retransmission time intervals or the like and the paging information is reported to each UE or a plurality of UEs using PCH (paging channel).

The UE having received the paging information uses the uplink interference information to set transmission power of RA bursts. Furthermore, since it is possible to control the error rate of RA burst transmission and RA burst transmission time intervals using the uplink interference information and dynamic persistent level parameter, priority of RA burst transmission can be controlled and the UE can select a more effective signature sequence.

In this way, detection characteristics of RACH improve in an access procedure started from the network side with the RACH system information transmitted through paging, whereas since RACH transmission is still contention based access, signature collision occurs.

In order to avoid signature collision, the access procedure started from the network side may allocate signatures and slots to be used for RACH transmission and may report the allocated signatures and slots to the UE through paging. The UE is set so as not to use the signature reported through paging for RACH transmission started from the UE side.

Non-Patent Document 1: R2-052769, LG Electronics, "Initial access for LTE" 3GPP TSG-RAN Working Group 2 #49 Seoul, Korea, Nov. 7-11, 2005

DISCLOSURE OF INVENTION

Problems to be Solved by the Invention

However, when signatures allocated by the network side to the UE are reserved all the time, since the number of signatures allocated by the UE side decreases, collision of RACHs including the signature allocated by the UE side increases.

Furthermore, when a preamble pattern used for a signature is non-orthogonal (even if sequences are orthogonal to each other, orthogonality may be lost due to frequency selective fading or the like) and even if no collision occurs, if there are many RACH transmissions in the same RACH transmission region, inter-code interference increases and the detection characteristic thereby deteriorates significantly. On the other hand, providing different RACH transmission regions for RACH transmission on the network side and on the UE side respectively results in an increase of overhead of the RACH transmission region.

It is therefore an object of the present invention to provide a radio transmitting apparatus and a radio transmission method that reduce a collision rate of RACH and improve detection characteristics of RACH.

Means for Solving the Problem

The radio transmitting apparatus of the present invention adopts a configuration including an RA burst transmission control section that restricts conditions for allocating a signature to the radio transmitting apparatus more when the number of signatures allocated by a network side, which is a communicating party, to other radio communication terminal apparatuses increases, or alleviates the conditions for allocating a signature to the radio transmitting apparatus more when the number of signatures allocated by the network side to the other radio communication terminal apparatuses decreases, an RA burst generating section that generates a random access burst including a signature when the condition is satisfied and a transmitting section that transmits the random access burst generated.

The radio transmission method of the present invention includes an RA burst transmission controlling step of restricting conditions for allocating a signature to the radio transmitting apparatus more when the number of signatures allocated by a network side, which is a communicating party, to other radio communication terminal apparatuses increases, or alleviating the conditions for allocating a signature to the radio transmitting apparatus more when the number of signatures allocated by the network side to the other radio communication terminal apparatuses decreases, an RA burst generating step of generating a random access burst including a signature when the condition is satisfied and a transmitting step of transmitting the random access burst generated.

Advantageous Effect of the Invention

According to the present invention, it is possible to reduce the RACH collision rate and improve the RACH detection performance.

BRIEF DESCRIPTION OF DRAWINGS

FIG. 9 shows conditions under which a UE according to Embodiment 2 of the present invention can allocate a signature to itself;

FIG. 11 shows conditions under which a UE according to Embodiment 3 of the present invention can allocate a signature to itself;

FIG. 12 shows a relationship between the number of signature allocations and inter-code interference.

BEST MODE FOR CARRYING OUT THE INVENTION

Hereinafter, embodiments of the present invention will be explained in detail with reference to the accompanying drawings.

Embodiment 1

Figure 1:
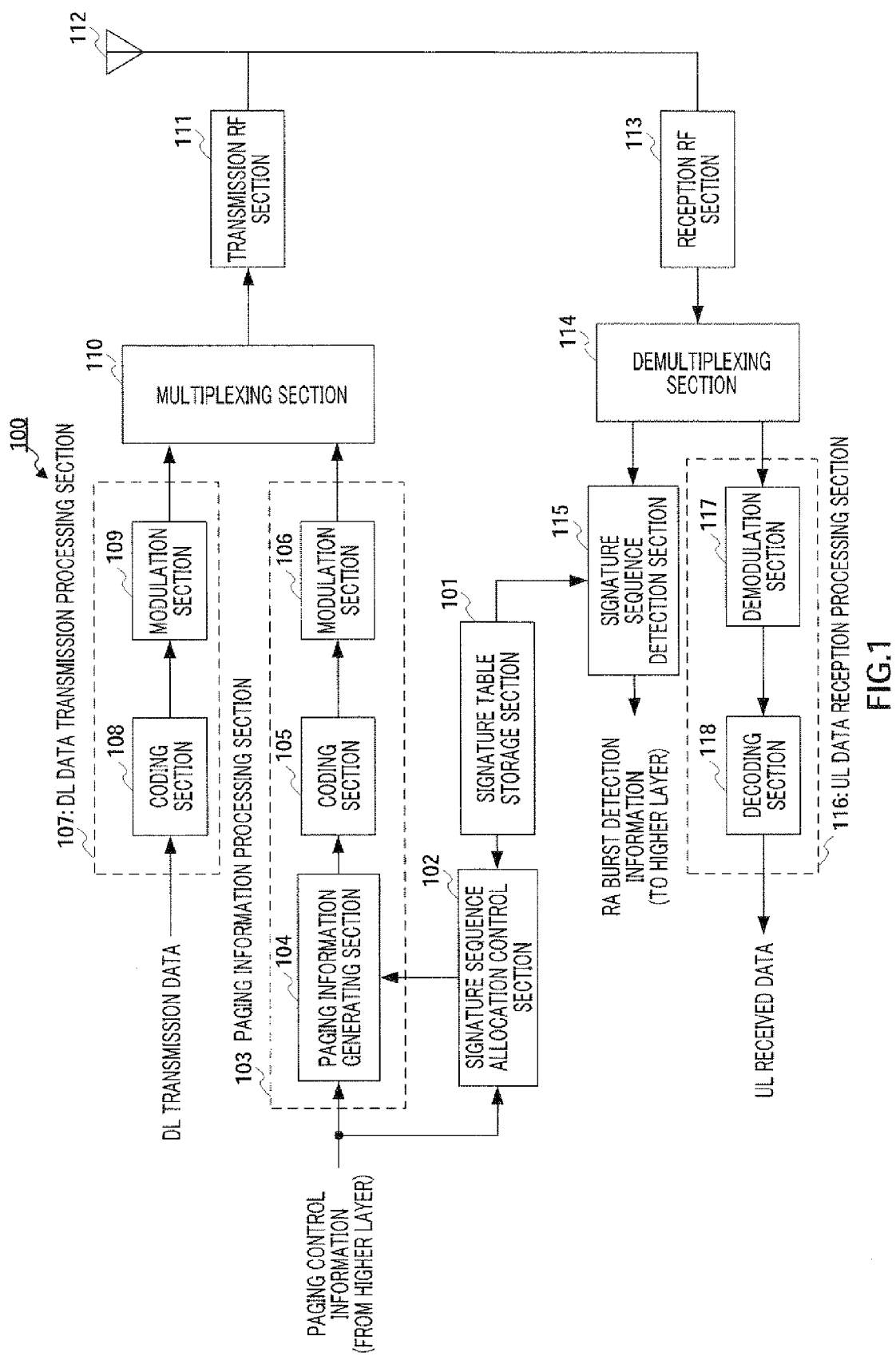
FIG. 1 is a block diagram showing a configuration of a base station apparatus according to Embodiment 1 of the present invention.
Figure 2:
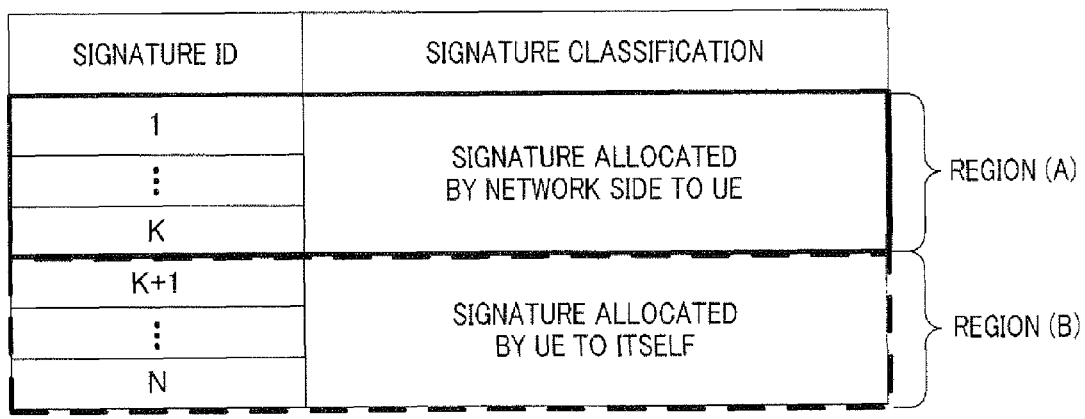
FIG. 2 shows signature classification of the signature table storage section shown in FIG. 1.

FIG. 1 is a block diagram showing a configuration of base station apparatus 100 according to Embodiment 1 of the present invention. In this figure, signature table storage section 101 stores a table storing signature IDs in a one-to-one correspondence with signature sequences. As shown in FIG. 2, suppose signatures classified by signature IDs 1 to K (region (A)) are signatures allocated by a network side to a UE and K+1 to N (region (B)) are signatures the UE allocates to itself.

Signature sequence allocation control section 102 acquires an identifier (UE ID) of a UE, which becomes a paging target from a higher layer (not shown), and also reads a signature ID from signature table storage section 101 and allocates the read signature ID to the UE which becomes the paging target.

Figure 3:
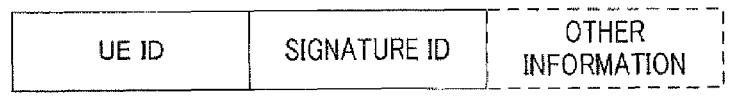
FIG. 3 is a schematic view showing a configuration of paging information.

Paging information processing section 103 is provided with paging information generating section 104, coding section 105 and modulation section 106. Paging information generating section 104 includes the signature ID outputted from signature sequence allocation control section 102, RA slot information (slot number to which RA channel is allocated) and paging control information (UE ID and other information reported through paging) inputted from a higher layer (not shown), and generates a paging channel (downlink control channel) as shown in FIG. 3. The paging channel generated is outputted to coding section 105.

Coding section 105 encodes the paging channel outputted from paging information generating section 104 and modulation section 106 modulates the encoded paging channel under a modulation scheme such as BPSK and QPSK. The modulated paging channel is outputted to multiplexing section 110.

DL data transmission processing section 107 is provided with coding section 108 and modulation section 109 and performs transmission processing on the DL transmission data. Coding section 108 encodes the DL transmission data and modulation section 109 modulates the encoded DL transmission data under a modulation scheme such as BPSK and QPSK and outputs the modulated DL transmission data to multiplexing section 110.

Multiplexing section 110 performs time multiplexing, frequency multiplexing, space multiplexing or code multiplexing on the paging channel outputted from modulation section 106 and DL transmission data outputted from modulation section 109 and outputs the multiplexed signal to transmission RF section 111.

Transmission RP section 111 applies predetermined radio transmission processing such as D/A conversion, filtering and up-conversion to the multiplexed signal outputted from multiplexing section 110 and transmits the signal subjected to the radio transmission processing from antenna 112.

Reception RF section 113 applies predetermined radio reception processing such as down-conversion and A/D conversion to the signal received via antenna 112 and outputs the signal subjected to the radio reception processing to demultiplexing section 114.

Demultiplexing section 114 separates the signal outputted from reception RF section 113 into an RA slot and a UL data slot and outputs the separated RA slot to signature sequence detection section 115 and the UL data slot to demodulation section 117 of UL data reception processing section 116 respectively.

Signature sequence detection section 115 performs preamble waveform detection processing such as correlation processing using the signatures stored in signature table storage section 101 on the RA slot outputted from demultiplexing section 114 and detects whether or not the signature sequence has been transmitted. The detection result (RA burst detection information) is outputted to a higher layer (not shown).

UL data reception processing section 116 is provided with demodulation section 117 and decoding section 118 and performs reception processing on the UL data. Demodulation section 117 corrects distortion of the channel response of the UL data outputted from demultiplexing section 114, makes a signal point decision by a hard decision or soft decision depending on the modulation scheme and decoding section 118 performs error correcting processing about the result of the signal point decision by demodulation section 117 and outputs the UL received data.

Figure 4:
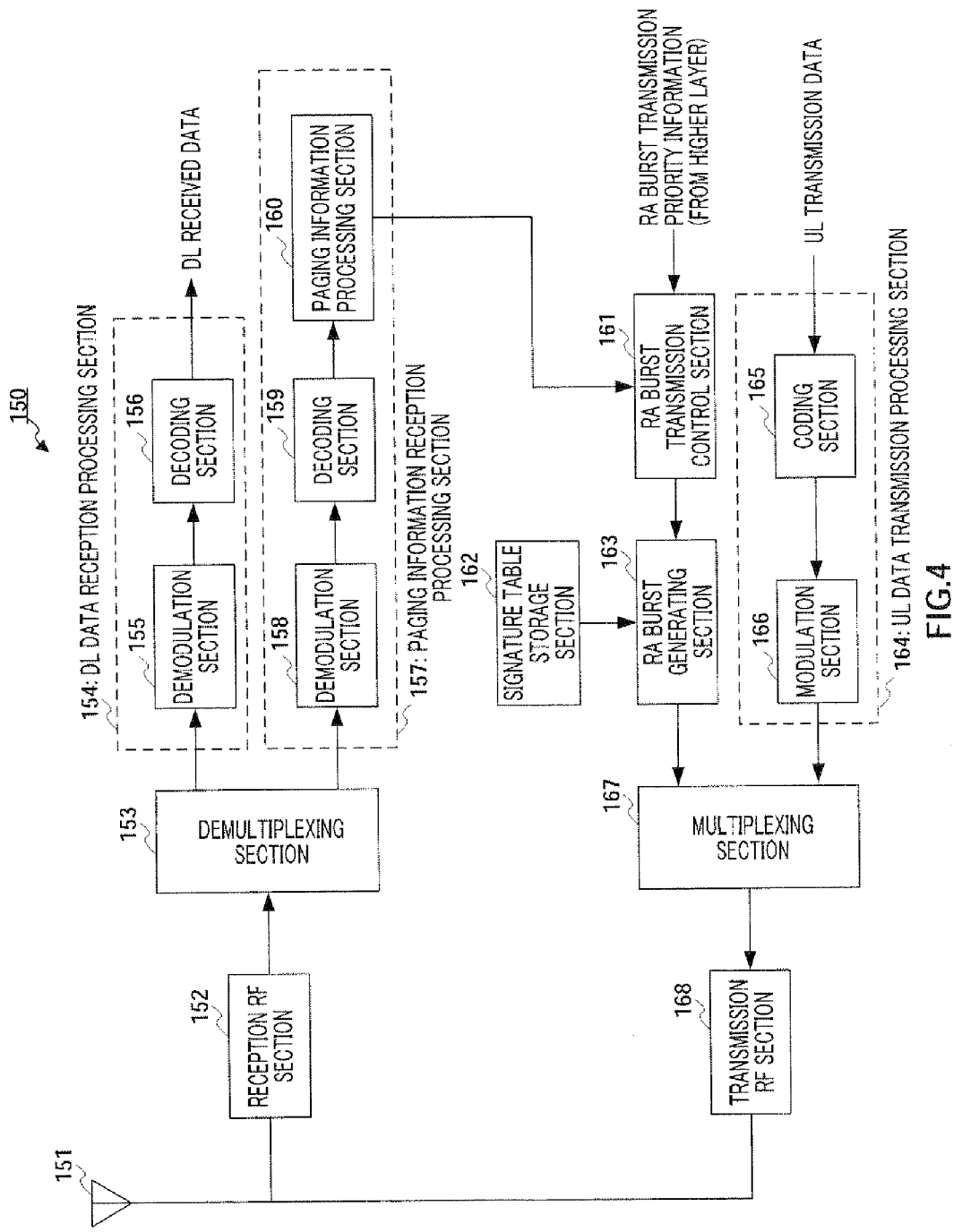
FIG. 4 is a block diagram showing the configuration of the terminal station apparatus according to Embodiment 1 of the present invention.

FIG. 4 is a block diagram showing a configuration of terminal station apparatus 150 according to Embodiment 1 of the present invention. In this figure, reception RF section 152 receives a signal transmitted from the BS shown in FIG. 1 via antenna 151 and applies predetermined radio reception processing such as down-conversion and A/D conversion to the received signal and outputs the signal subjected to the radio reception processing to demultiplexing section 153.

Demultiplexing section 153 separates the paging channel and DL data included in the signal outputted from reception RF section 152 and outputs the separated DL data to demodulation section 155 of DL data reception processing section 154 and the paging channel to demodulation section 158 of paging information reception processing section 157.

DL data reception processing section 154 is provided with demodulation section 155 and decoding section 156, and performs reception processing on the DL data. Demodulation section 155 corrects distortion of the channel response on the DL data outputted from demultiplexing section 153, makes a signal point decision by a hard decision or soft decision depending on the modulation scheme, and decoding section 156 performs error correcting processing on the signal point decision result from demodulation section 155 and outputs the DL received data.

Paging information reception processing section 157 is provided with demodulation section 158, decoding section 159 and paging information processing section 160, and performs reception processing on the paging channel. Demodulation section 158 corrects distortion of the channel response of the paging channel outputted from demultiplexing section 153, makes a signal point decision by a hard decision or soft decision depending on the modulation scheme, and decoding section 159 performs error correcting processing on the signal point decision result of the paging channel by demodulation section 158 and outputs paging information. The paging information subjected to the error correcting processing is outputted to paging information processing section 160.

Paging information processing section 160 decides whether or not the paging information has been acquired from decoding section 159 and outputs, when the paging information has been acquired, the acquired paging information to RA burst transmission control section 161. On the other hand, when the paging information has not been acquired, paging information processing section 160 reports the fact to RA burst transmission control section 161.

RA burst transmission control section 161 decides whether or not the paging information outputted from paging information processing section 160 is directed to terminal station apparatus 150. When the paging information is directed to terminal station apparatus 150, RA burst transmission control section 161 outputs the signature ID and RA slot information included in the paging information outputted from paging information processing section 160 to RA burst generating section 163. On the other hand, when the paging information is not directed to terminal station apparatus 150 (directed to another station), RA burst transmission control section 161 reports, if RA burst transmission priority information inputted from a higher layer (not shown) satisfies the condition which will be described later, that fact to RA burst generating section 163. Here, the "RA burst transmission priority information" refers to information whose communication service has a high degree of emergency or priority such as emergency communication, a service with a stringent delay requirement (e.g., VoIP, video streaming, gaming), retransmission RACH (which has higher priority as the number of retransmissions increases) and high service fee. Details of RA burst transmission control section 161 will be described later.

Signature table storage section 162 stores a signature table held by signature table storage section 101 of BS 100 shown in FIG. 1, that is, a table storing signature IDs in a one-to-one correspondence with signature sequences. As shown in FIG. 2 as in the case of the signature table held by signature table storage section 101, suppose signatures classified by signature IDs 1 to K (region (A)) are signatures allocated by the network side to UE 150 and K+1 to N (region (B)) are signatures allocated by UE 150.

RA burst generating section 163 reads the signature sequence corresponding to the signature ID outputted from RA burst transmission control section 161 from signature table storage section 162, generates an RA burst by including the read signature sequence and outputs the generated RA burst to multiplexing section 167.

UL data transmission processing section 164 is provided with coding section 165 and modulation section 166, and performs transmission processing on UL transmission data. Coding section 165 encodes the UL transmission data and modulation section 166 modulates the encoded UL transmission data under a modulation scheme such as BPSK and QPSK and outputs the modulated UL transmission data to multiplexing section 167.

Multiplexing section 167 multiplexes the RA burst outputted from RA burst generating section 163 and the UL transmission data outputted from modulation section 166, and outputs the multiplexed signal to transmission RF section 168.

Transmission RF section 168 applies predetermined radio transmission processing such as D/A conversion, filtering and up-conversion to the multiplexed signal outputted from multiplexing section 167 and transmits the signal subjected to the radio transmission processing from antenna 151.

Figure 5:
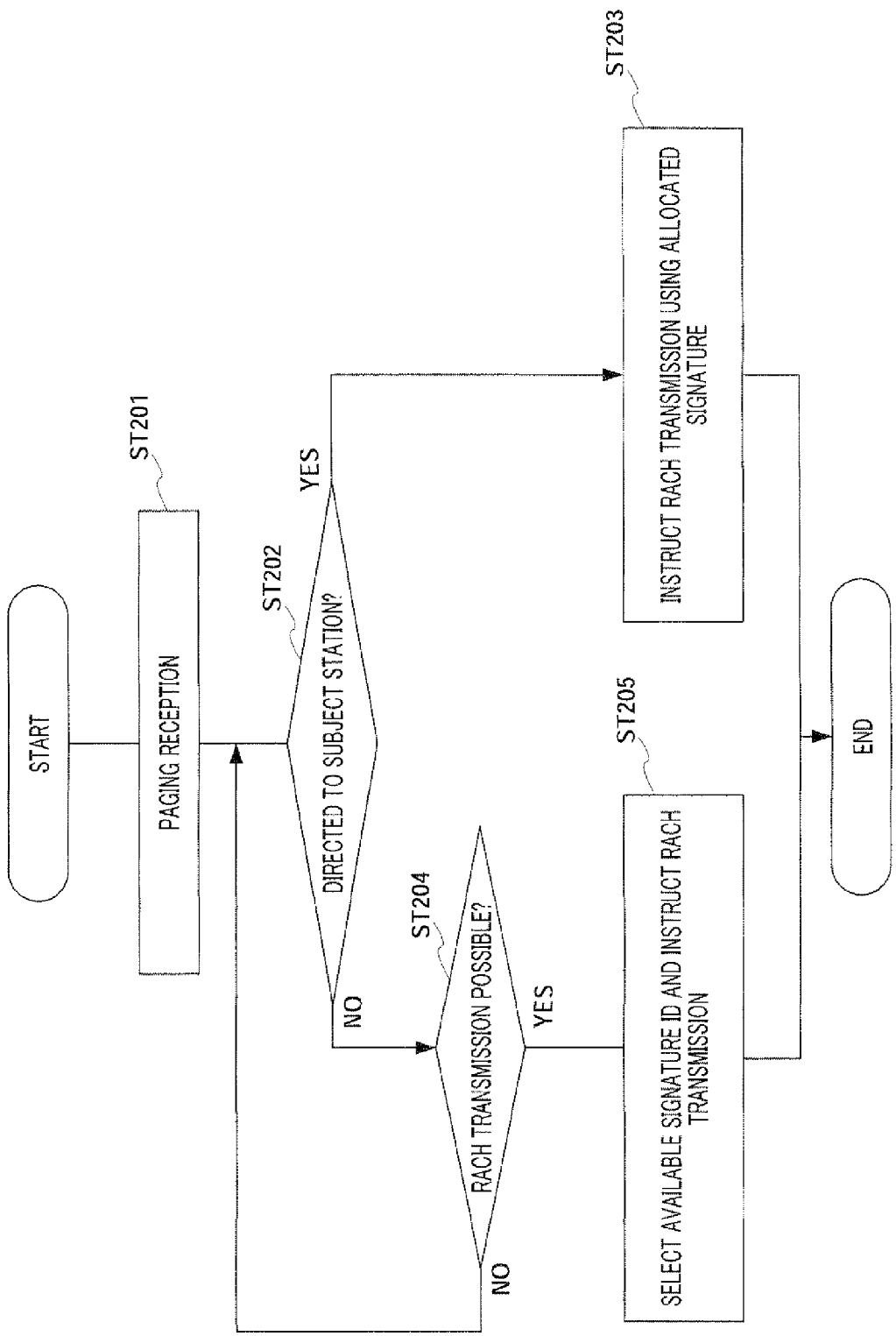
FIG. 5 is a flowchart showing operations of the RA burst transmission control section of the terminal station apparatus shown in FIG. 4.

Next, operations of RA burst transmission control section 161 of the terminal station apparatus shown in FIG. 4 will be explained using FIG. 5. In FIG. 5, in step (hereinafter, abbreviated as "ST") 201, RA burst transmission control section 161 acquires the paging information from paging information processing section 160.

In ST202, RA burst transmission control section 161 decides whether or not a UE ID included in the acquired paging information indicates terminal station apparatus 150, moves to ST203 when the UE ID indicates terminal station apparatus 150 or moves to ST204 when the UE ID does not indicate terminal station apparatus 150.

In ST203, in order to perform RA burst transmission using the signature ID (one of region (A) shown in FIG. 2) included in the acquired paging information and in an RA slot specified using also the acquired paging information, the signature ID and RA slot information are outputted to RA burst generating section 163.

In ST204, the UE refers to a condition under which the UE can allocate a signature to itself based on RA burst transmission priority information (or reason for transmission of RACH) inputted from a higher layer and the number of signatures allocated by the network side to other UEs and decides whether or not it is possible to transmit the RA burst. The number of signatures allocated by the network side to the other UEs is the same as the number of UE IDs included in the paging information and can thereby be acquired from this number of UE IDs. When RA burst transmission is permitted, the process moves to ST205 and when RA burst transmission is not permitted, the process returns to ST202 and performs processing on the next RA slot.

In ST205, the UE side determines the signature ID from among the signatures (region (B) shown in FIG. 2) allocated by the UE to itself according to a predetermined selection rule. Here, for example, a method of randomly determining one signature from among available signatures is generally used as the predetermined selection rule. The signature ID and RA slot information determined in ST205 are outputted to RA burst generating section 163.

In ST204, when demodulation of the paging information fails in ST201 or the demodulation itself is not performed and the presence/absence of the paging information is unknown, the network side assumes that all signatures allocatable to the UEs have been allocated, determines whether or not it is possible to transmit the RA burst, and can thereby perform control so as to prevent congestion of RA burst transmission to the RA slot.

Furthermore, in ST205, since the signature IDs reported to the other UEs in ST201 can be acquired, the UE may allocate a signature allocated to none of the other UEs by the network side to itself. In this way, the number of signatures allocatable by the UE to itself increases and the collision rate of RACH can thereby be reduced.

Here, the condition under which the UE can allocate a signature to itself will be explained using FIG. 6. Here, a case where four signatures are multiplexed with one RA slot will be shown as an example.

Figure 6:
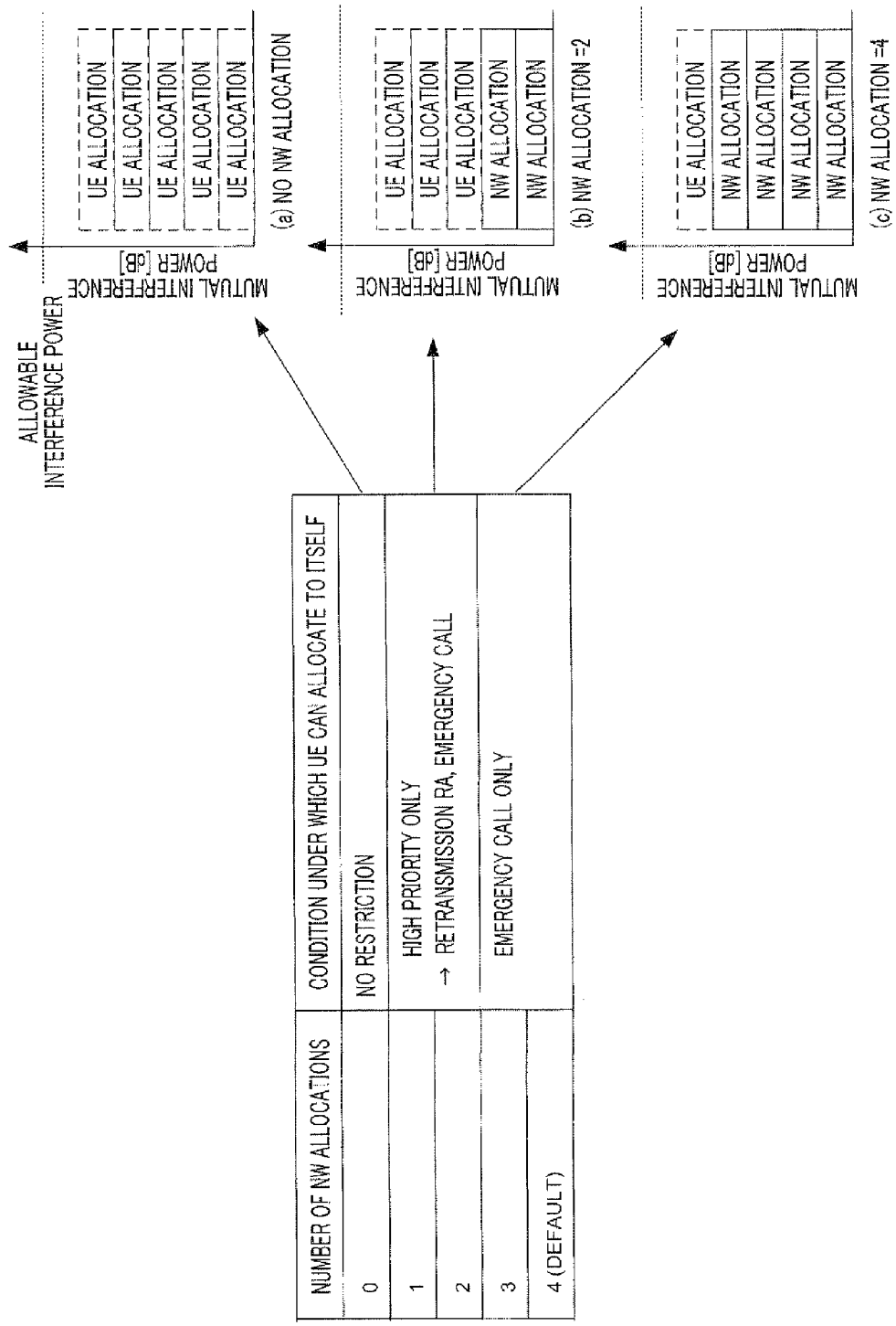
FIG. 6 shows conditions under which a UE can allocate a signature to itself.

As shown in FIG. 6, when the number of signatures allocated by the network side to UEs is 0, there is no restriction on conditions and all UEs can allocate signatures to themselves.

On the other hand, when the number of signatures allocated by the network side to UEs is 1 and 2, only UEs with a service of high priority such as retransmission RA or emergency communication (emergency call) can allocate signatures to themselves.

Furthermore, when the number of signatures allocated by the network side to UEs is 3 and 4, only UEs corresponding to emergency communication (emergency call) can allocate signatures to themselves.

In this way, by reducing the expected value (statistic mean value) of the number of RAs using signatures allocated by UEs to themselves as the number of signatures allocated by the network side to the UEs increases and by increasing the expected value of the number of RAs using signatures allocated by the UEs to themselves as the number of signatures allocated by the network side to the UEs decreases, it is possible to maximize the number of RACH transmissions while satisfying required conditions of detection characteristics of all RACH preambles in one RA slot.

RA burst transmission control section 161 of UE 150 shown in FIG. 4 decides whether or not it is possible to allocate a signature to itself based on the conditions shown in FIG. 6.

Next, the random access procedure between BS 100 shown in FIG. 1 and UE 150 shown in FIG. 4 will be explained using FIG. 7. Here, suppose UE 150 is not carrying out transmission/reception of data for a certain period of time (IDLE state) first.

Figure 7:
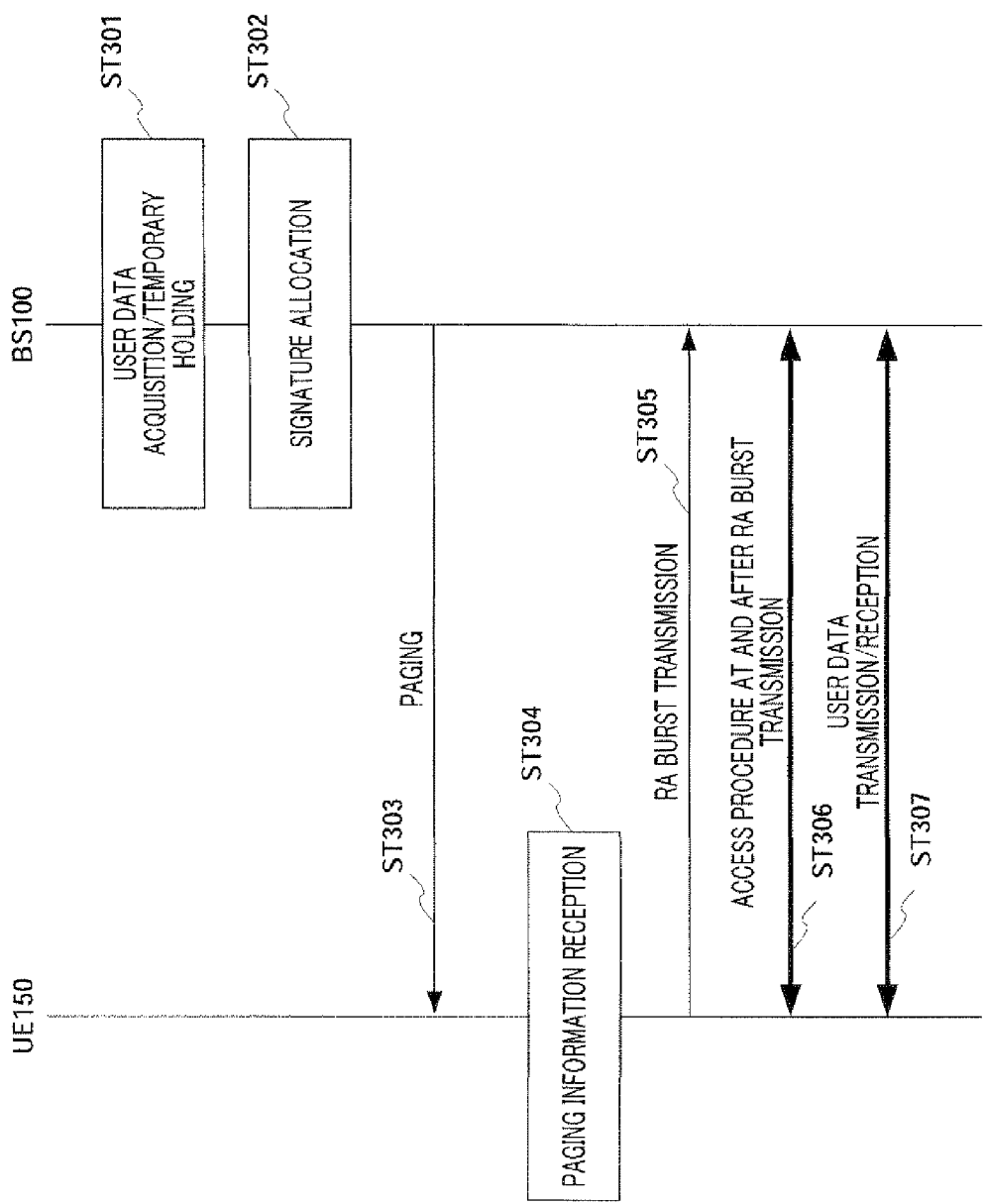
FIG. 7 is a sequence diagram showing a random access procedure between the BS shown in FIG. 1 and the UE shown in FIG. 4.

In FIG. 7, in ST301, BS 100 acquires user data directed to UE 150 from a higher layer. Since a connection with UE 150 has not been established yet, BS 100 temporarily holds the acquired user data.

In ST302, one signature is selected from region (A) (see FIG. 2) of the signature table held by signature table storage section 101 of BS 100 and the selected signature is allocated to UE 150.

In ST303, the paging information including the UE ID of UE 150, ID of the signature allocated to UE 150 and RA slot information is reported to UE 150 using a downlink control channel (e.g., paging channel).

In ST304, UE 150 having received the paging Information acquires the UE ID, allocated signature ID and RA slot included in the paging information. When the acquired UE ID indicates UE 150, the signature corresponding to the acquired signature ID is read from the same signature table as that of BS 100 and RA burst transmission is carried out using the acquired RA slot in ST305.

In ST306 when BS 100 having received the RA burst detects a preamble corresponding to the signature ID included in the paging information out of the received RA burst in ST303, BS 100 carries out transmission/reception of information necessary to perform user data transmission to/from UE 150 such as reporting ACK in response to the RA burst, uplink transmission start timing control information (time alignment information) and temporary UE ID (equivalent to C-RNTI in WCDMA) used for a band allocation report or the like.

In ST307, band allocation and transmission/reception of user data are carried out between BS 100 and UE 150.

In this way, according to Embodiment 1, when the UE sets a condition under which the UE can allocate a signature to itself according to the number of signatures allocated by the network side to the other UE, the UE can select a signature not allocated on the network side according to a selection rule (e.g., random selection), and can thereby reduce the collision rate of RACH. Furthermore, when the UE sets the condition under which a signature can be allocated to itself within a range in which power of mutual interference between signatures satisfies allowable interference power, it is possible to suppress increases in mutual interference power between signatures and thereby improve the RACH detection characteristics.

Figure 8:
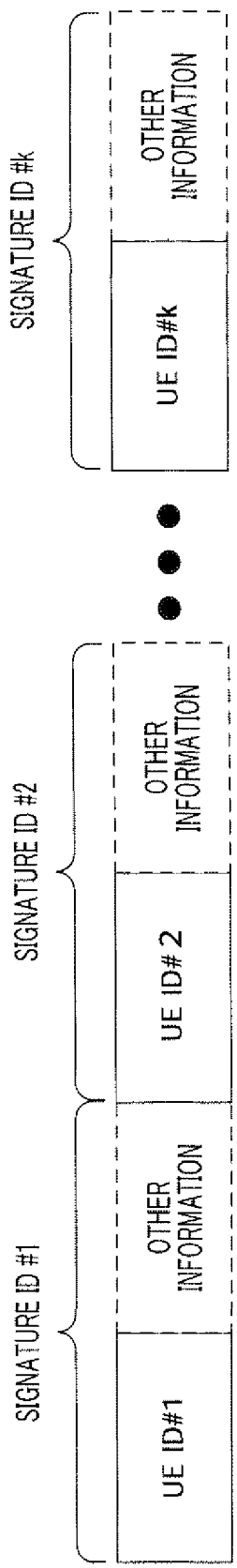
FIG. 8 is a schematic diagram showing another configuration of paging information.

In the present embodiment, a method of explicitly transmitting a signature ID as control information as shown in FIG. 3 may be used as the method of reporting a signature ID, and when a plurality of pieces of paging information simultaneously generated are reported collectively, the sequence of UE IDs and sequence of signature IDs may be set beforehand as shown in FIG. 8 and it is thereby possible to prevent an increase of control information for reporting signature IDs. Furthermore, the same applies to a case where RA slots for paging are reported with paging information.

Embodiment 2

Configurations of a base station apparatus and a terminal station apparatus according to Embodiment 2 of the present invention are the same as those of Embodiment 1 shown in FIG. 1 and FIG. 4 and only part of the functions are different, and therefore only different functions will be explained using FIG. 1 and FIG. 4 and overlapping explanations will be omitted.

FIG. 9 shows conditions under which a UE according to Embodiment 2 of the present invention can allocate a signature to itself. Taking into consideration the fact that the number of signatures allocated by the network side to the UE decreases for each retransmission, as shown in FIG. 9, the network side alleviates the conditions under which the UE can allocate a signature to itself in order of an RA slot (initial RA slot) including the signature allocated by the network side to the UE, next RA slot and next but one RA slot.

To be more specific, suppose the condition is the same as that of Embodiment 1 shown in FIG. 6 in the initial RA slot. Furthermore, in the next RA slot, when the number of signatures allocated by the network side to the UE is 0 to 2, there is no restriction on conditions and all UEs can allocate signatures to themselves.

Furthermore, in the next RA slot, when the number of signatures allocated by the network to the UE is 3 and 4, only UEs with a service of high priority such as retransmission RA or emergency communication (emergency call) can allocate signatures to themselves.

Furthermore, in the next but one RA slot, when the number of signatures allocated by the network side to the UE corresponds to all 0 to 4, there is no restriction on conditions and all UEs can allocate signatures to themselves.

Here, the UE controls the expected value of the number of RAs using the signature allocated to the UE itself based on a reception success rate (retransmission rate) per number of signatures allocated by the network side to the UE and the expected value of the number of retransmission RAs in the next RA slot obtained from the number of retransmissions of RA burst.

Figure 10:
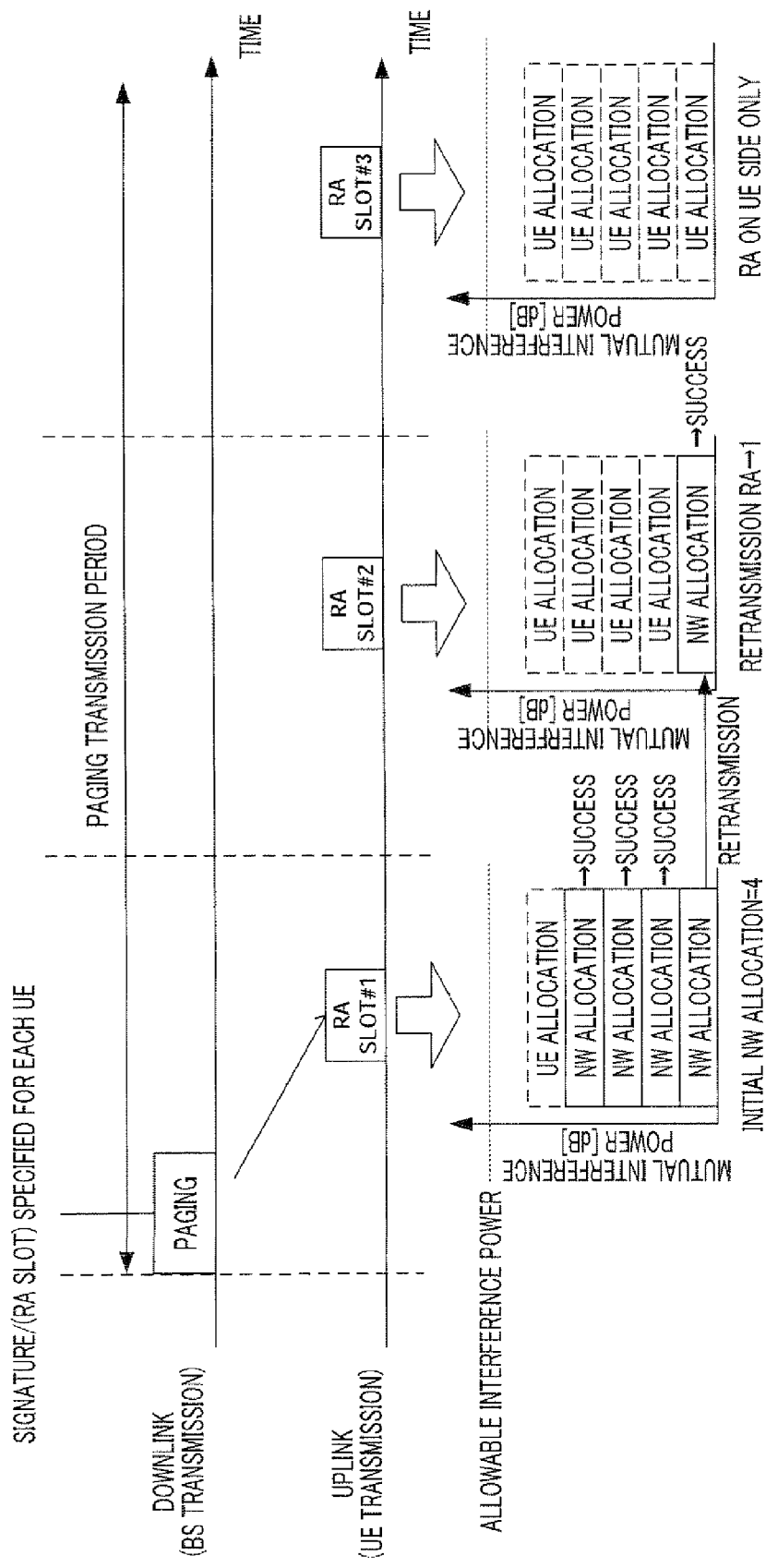
FIG. 10 shows transition deriving from signatures included in RA slot#1 and following RA slots#2 and #3.

FIG. 10 shows transition in the number of transmission RA bursts included in RA slot#1 (initial RA slot) and following RA slot#2 (next RA slot) and #3 (next but one RA slot) for which the network side has allocated signature to the UE. In this figure, suppose the number of signatures allocated by the network side to the UE is 4 in RA slot#1 and the number of signatures allocated by the UE to itself is 1. In this case, suppose three of the RAs using signatures allocated by the network side to the UE have succeeded in reception and one has failed in reception.

Next, in RA slot#2, suppose the RA having failed in reception in RA slot#1 is retransmitted and the UE assumes the remaining four RAs as signatures to be allocated to itself. Furthermore, in RA slot#3, suppose the UE assumes all five RAs that can be transmitted in this RA slot as signatures to be allocated to itself.

In this way, in consideration of the fact that the number of retransmissions of RA bursts to which signatures are allocated decreases in an RA slot that follows an RA slot including a signature allocated by the network side to the UE, Embodiment 2 alleviate the conditions under which the UE can allocate a signature to itself, and thereby allows even a UE which does not correspond to the conditions in the following RA slots to allocate a signature to itself and improve the utilization efficiency of the RA slots.

Embodiment 3

Configurations of a base station apparatus and a terminal station apparatus according to Embodiment 3 of the present invention are the same as the configurations of Embodiment 1 shown in FIG. 1 and FIG. 4, and only part of the functions are different, and therefore only different functions will be explained with reference to FIG. 1 and FIG. 4 and overlapping explanations will be omitted.

FIG. 11 shows conditions under which a UE according to Embodiment 3 of the present invention can allocate a signature to itself. The conditions of Embodiment 1 shown in FIG. 6 are shown on the left side of FIG. 11 for comparison.

Here, the network side allocates signatures to a UE in order starting with a signature sequence with high orthogonality (with small inter-code interference). Such allocations provide a relationship between the number of signature allocations and inter-code interference as shown in FIG. 12. That is, the amount of inter-code interference increases exponentially as the number of signature allocations increases.

Therefore, as shown in FIG. 11, since the amount of mutual interference between simultaneously transmitted sequences increases exponentially as the number of signatures allocated by the network side to the UE, conditions are set so as to reduce expected values of the number of RAs using signatures allocated by the UE to itself.

Figure 13:
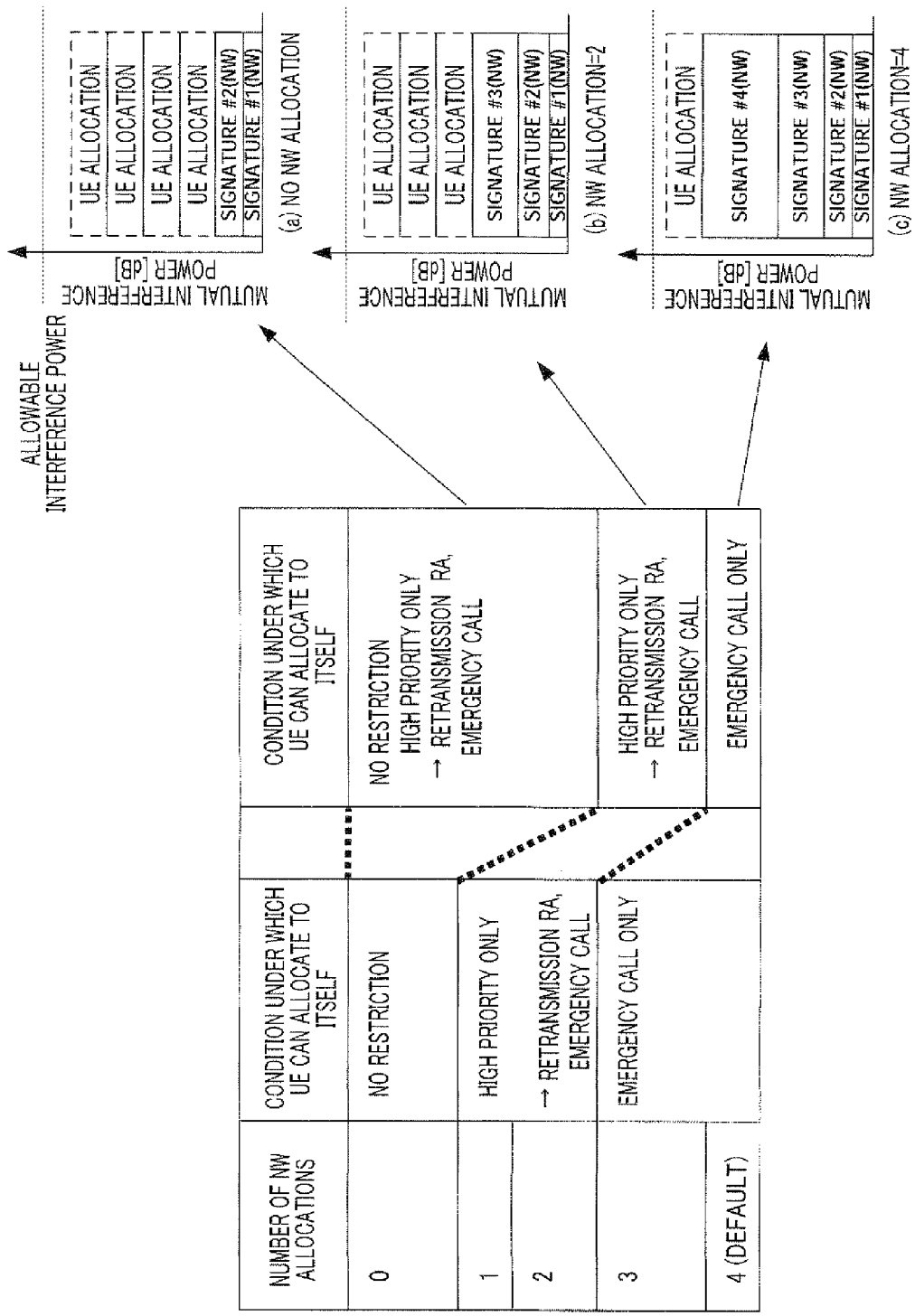
FIG. 13 shows a relationship between the number of signatures allocated by the network side to the UE and interference power.

FIG. 13 shows a relationship between the number of signatures allocated by the network side to UEs and interference power. As shown in this figure, when the number of signatures allocated by the network side to the UE is small, since the interference power between these allocated signatures is small, the number of signatures allocated by the UE to itself can be increased.

On the other hand, when the number of signatures allocated by the network side to the UE is large, since the interference power between these allocated signatures is large, average interference power decreases unless the number of signatures allocated by the network side to the UE is always a maximum value, the number of signatures that can be allocated to the UE can be increased.

In this way, according to Embodiment 3, the network side allocates signatures to the UE starting with a signature sequence with small inter-code interference, and the UE can thereby give greater interference margin to RAs using signatures allocated by the UE to itself, and therefore the number of RAs that can be transmitted/received per RA slot can be increased.

Cases have been explained in the above-described embodiments assuming that the network side reports signatures allocated to UEs to the UEs using paging channels, but the present invention is not limited to this and the network side may also report signatures using, for example, a downlink control channel including scheduling information or a downlink common channel including an L2/L3 control message.

The above-described embodiments have explained the case where the present invention is configured by hardware as an example, but the present invention can also be implemented by software.

Furthermore, each functional block used for the explanations of the above-described embodiments is typically implemented as an LSI which is an integrated circuit. These may be integrated into a single chip individually or may be integrated into a single chip so as to include some or all functional blocks. Here, the term LSI is used, but the term may also be "IC," "system LSI," "super LSI" or "ultra LSI" depending on the difference in the degree of integration.

Furthermore, the technique of implementing an integrated circuit is not limited to an LSI but can also be implemented with a dedicated circuit or a general-purpose processor. It is also possible to use an FPGA (Field Programmable Gate Array) which can be programmed or a reconfigurable processor whose connections or settings of circuit cells inside the LSI are reconfigurable after LSI manufacturing.

Moreover, if a technology of realizing an integrated circuit which is substitutable for an LSI appears with the progress in semiconductor technologies and other derived technologies, it is of course possible to integrate functional blocks using the technology. The adaptation of biotechnology or the like can be considered as a possibility.

The disclosure of Japanese Patent Application No. 2006-261197, filed on Sep. 26, 2006, including the specification, drawings and abstract is incorporated herein by reference in its entirety.

INDUSTRIAL APPLICABILITY

The radio transmitting apparatus and radio transmission method according to the present invention can not only reduce the RACH collision rate but also improve the RACH detection characteristics, and can be applied to a mobile communication system and so on.

The invention claimed is:

1. A radio transmitting apparatus comprising:
   an random access burst transmission control section that restricts conditions for allocating a signature to the radio transmitting apparatus more when the number of signatures allocated by a network side, which is a communicating party, to other radio communication terminal apparatuses increases, or alleviates the conditions for allocating a signature to the radio transmitting apparatus more when the number of signatures allocated by the network side to the other radio communication terminal apparatuses decreases;
   an random access burst generating section that generates a random access burst including a signature when the condition is satisfied; and
   a transmitting section that transmits the random access burst generated.

2. The radio transmitting apparatus according to claim 1, wherein the random access burst transmission control section sequentially alleviates the conditions under which a signature is allocated to the radio transmitting apparatus in a slot following the slot including the signature allocated by the network side.

3. The radio transmitting apparatus according to claim 1, wherein, when the network side allocates signatures in descending order of orthogonality, the random access burst transmission control section restricts conditions for allocating a signature to the radio transmitting apparatus more when the number of signatures allocated by the network side increases or alleviates the conditions for allocating a signature to the radio transmitting apparatus more when the number of signatures allocated by the network side decreases.

4. A radio transmission method comprising:
   an random access burst transmission controlling step of restricting conditions for allocating a signature to a radio transmitting apparatus more when the number of signatures allocated by a network side, which is a communicating party, to other radio communication terminal apparatuses increases, or alleviating the conditions for allocating a signature to the radio transmitting apparatus more when the number of signatures allocated by the network side to the other radio communication terminal apparatuses decreases;
   an random access burst generating step of generating a random access burst including a signature when the condition is satisfied; and
   a transmitting step of transmitting the random access burst generated.

* * * * *